Aug. 23, 1949.  H. L. FOUCH ET AL  2,479,609
METHOD OF MANUFACTURING GARMENTS
Filed Dec. 20, 1946  11 Sheets-Sheet 5

Aug. 23, 1949.　　　　H. L. FOUCH ET AL　　　　2,479,609
METHOD OF MANUFACTURING GARMENTS
Filed Dec. 20, 1946　　　　　　　　　　　　11 Sheets-Sheet 6

Inventors:
Herschel L. Fouch
Raymond S. Yorby
By Hinkle, Horton, Ekberg, Hausmann & Tupper
Attorneys.

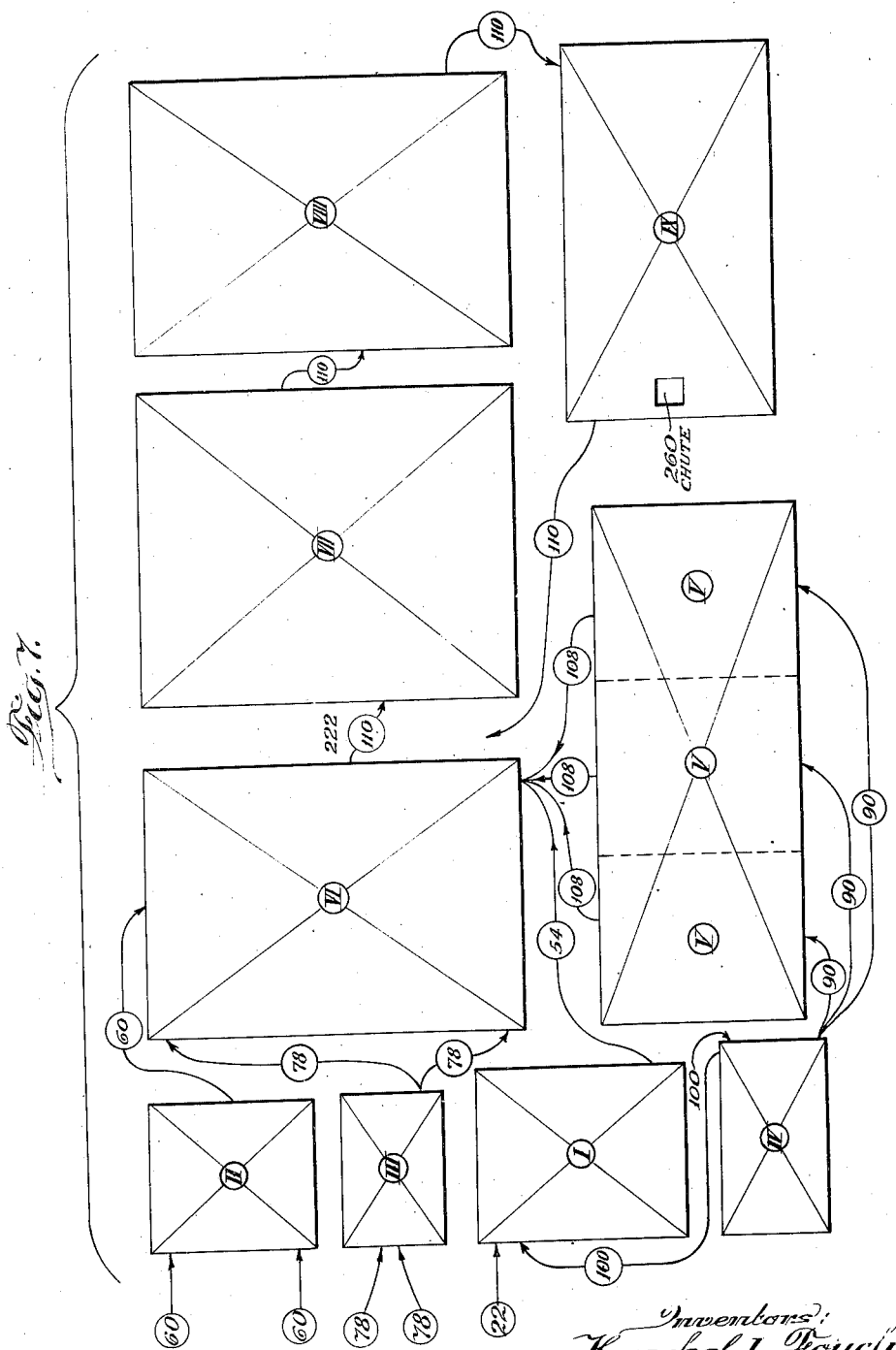

Aug. 23, 1949.   H. L. FOUCH ET AL   2,479,609
METHOD OF MANUFACTURING GARMENTS
Filed Dec. 20, 1946   11 Sheets-Sheet 8
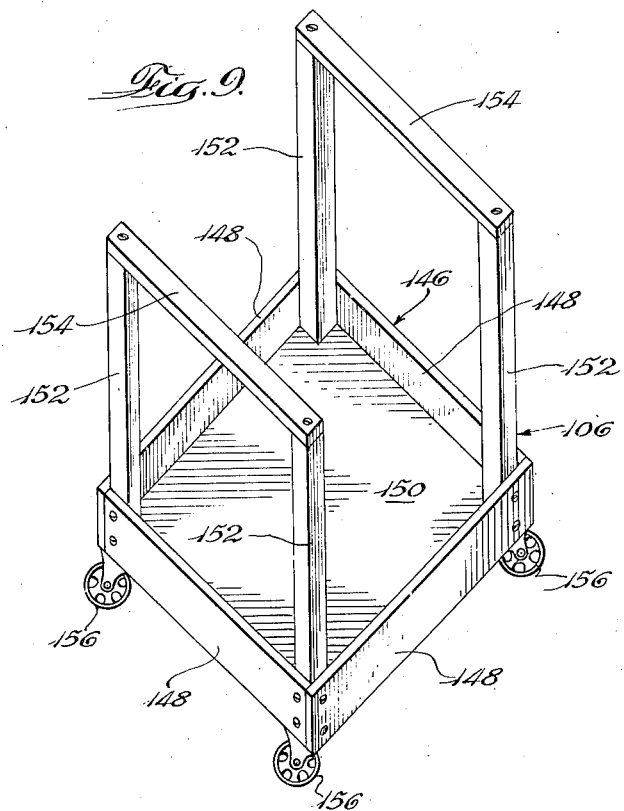
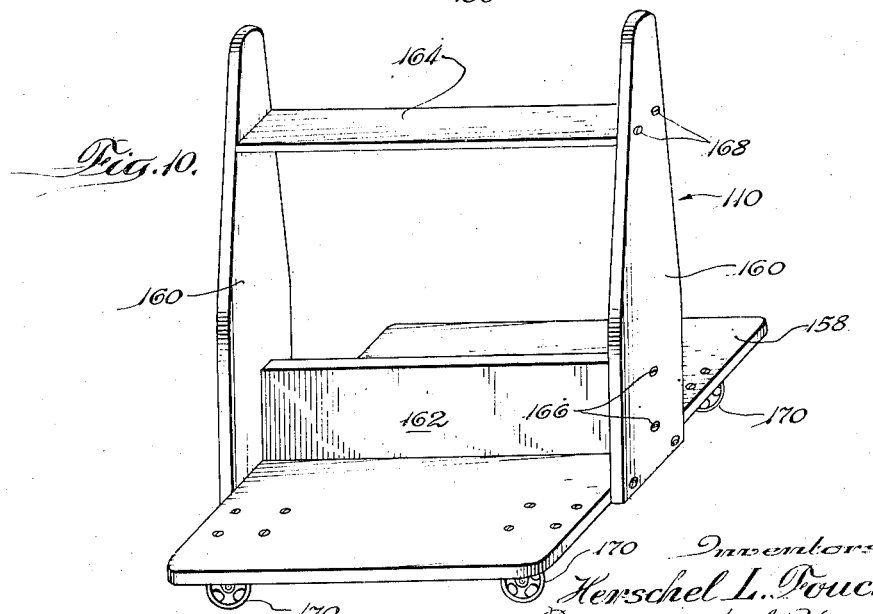

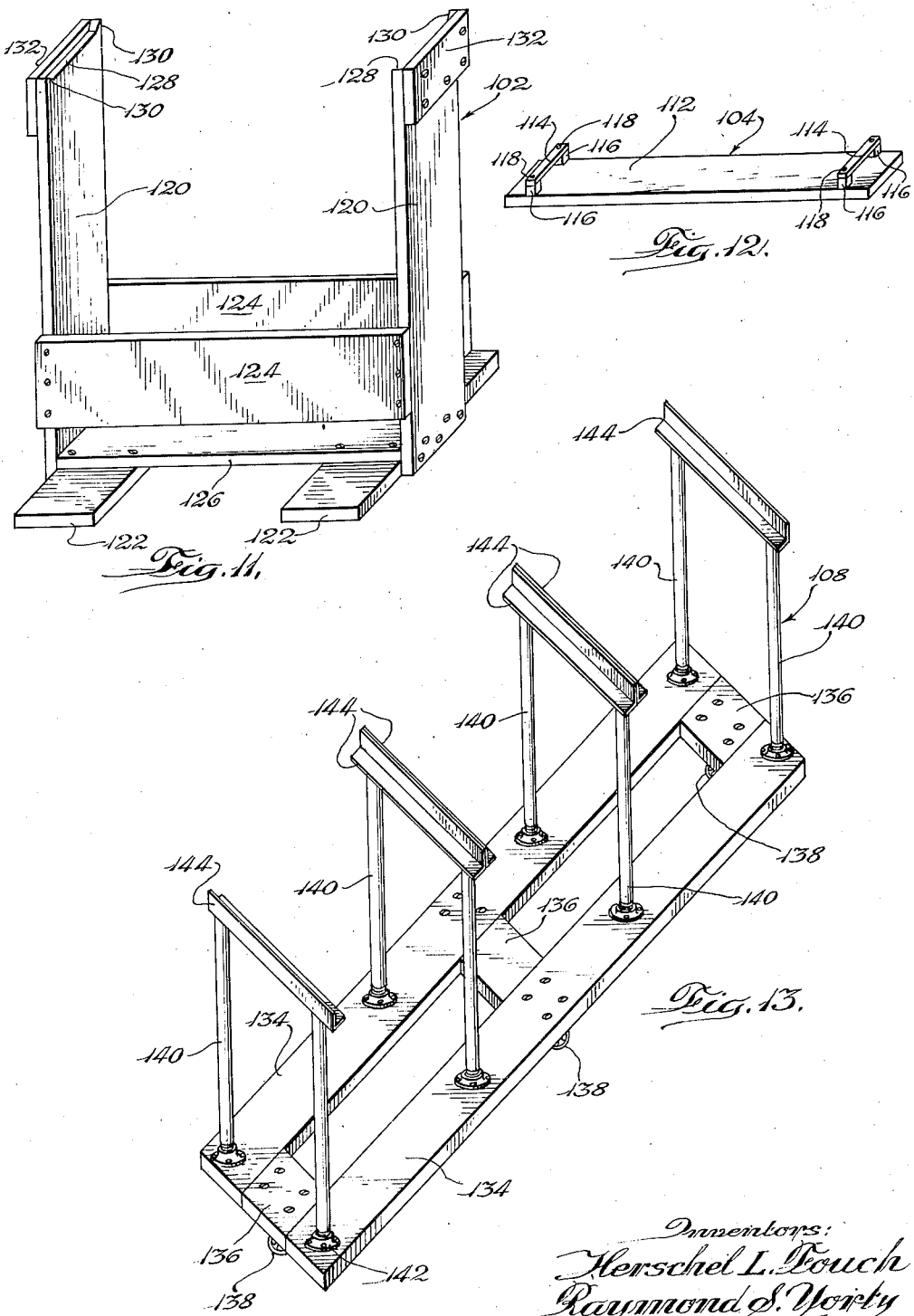

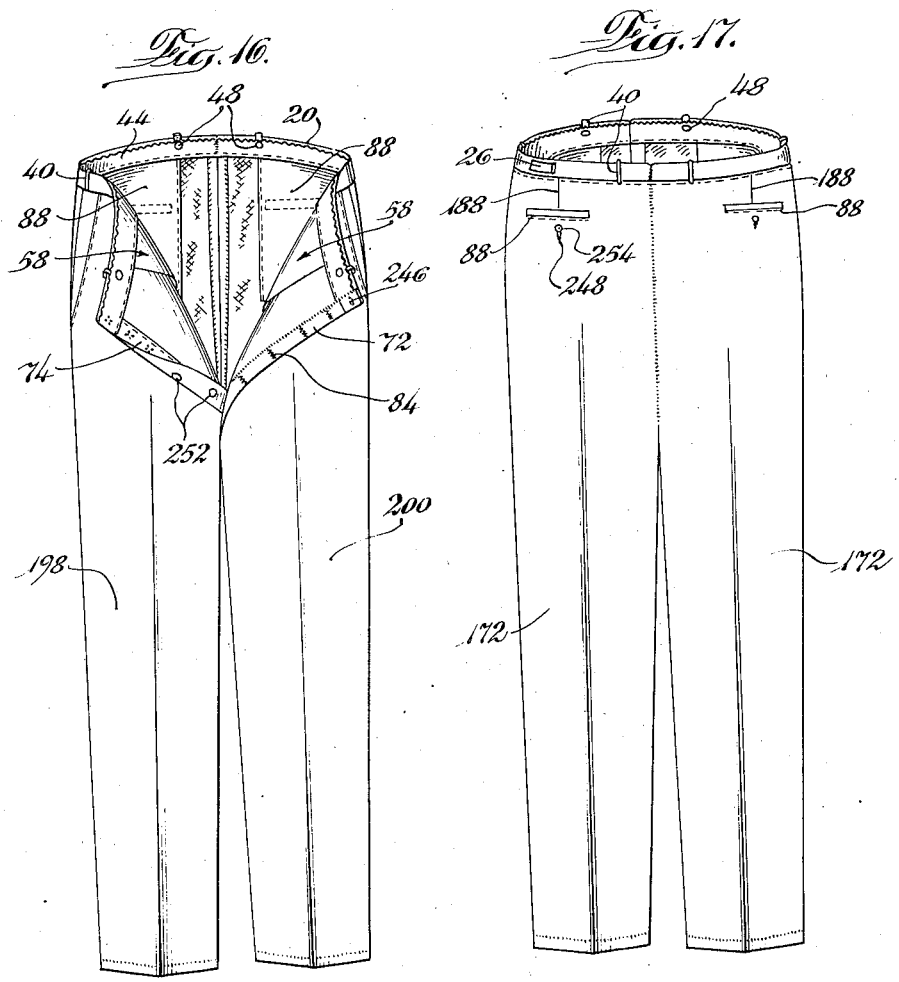

Patented Aug. 23, 1949

2,479,609

UNITED STATES PATENT OFFICE 2,479,609

METHOD OF MANUFACTURING GARMENTS

Herschel L. Fouch and Raymond S. Yorty, Chicago, Ill., assignors to Reliance Manufacturing Company, Chicago, Ill., a corporation of Illinois Application December 20, 1946, Serial No. 717,418

8 Claims. (Cl. 2—243)

Our invention relates to a mass production method of manufacturing garments; it is concerned with those steps of the complete method wherein the cut parts are sewed together.

The invention will be described in detail with reference to the manufacture of pants but it is to be understood that with few clearly indicated changes and modifications the method may readily be adapted for the mass production and manufacture of other garments.

The principal object of the present invention is to provide an improved mass production method for the manufacture of garments which will increase the operator efficiency without increasing the operator effort.

A further object is to provide an improved method for manufacturing garments which more efficiently utilizes the available floor space in a manufacturing plant.

A further object is to provide an improved method of manufacturing garments which utilizes a more efficient continuous operation than heretofore.

Still another object is to provide an improved method where the individual operators are able to perform the same operation continuously for substantial lengths of time, thereby relieving the operator from the necessity of changing from one operation to another and from one operating station to another.

Still another object is to provide an improved method of manufacturing garments wherein the component parts of the garments are continuously moving toward the station where the final step is performed, thereby minimizing the storage and accumulation of partially completed garments.

Another object is to provide a method of manufacturing garments which effects a substantial saving in manufacturing costs within the framework of an existing wage scale by promoting increased operator efficiency.

A still further object is to provide certain novel pieces of apparatus for carrying out the method of the present invention, which apparatus is simple, sturdy and inexpensive.

Other objects and advantages will become apparent from the following description taken in conjunction with the accompanying drawings wherein:

Fig. 7 is a diagrammatic illustration of the relative positions of stations I to IX, inclusive, each station being indicated by a rectangle, and illustrating the flow of parts through the process;

Fig. 9 is a perspective illustration of a mobile removable bar storage truck.

Fig. 10 is a perspective view of a mobile assembly truck;

Fig. 11 is a perspective view of a stationary removable bar rack;

Fig. 12 is a perspective view of a removable bar;

Fig. 13 is a perspective view of a mobile rack of the track type adapted to accommodate several removable bars;

Fig. 16 is a front view of a pair of pants made according to the present invention, with the fly open; and Fig. 17 is a rear view of the same pair of pants illustrated in Fig. 16.

Figure 1:
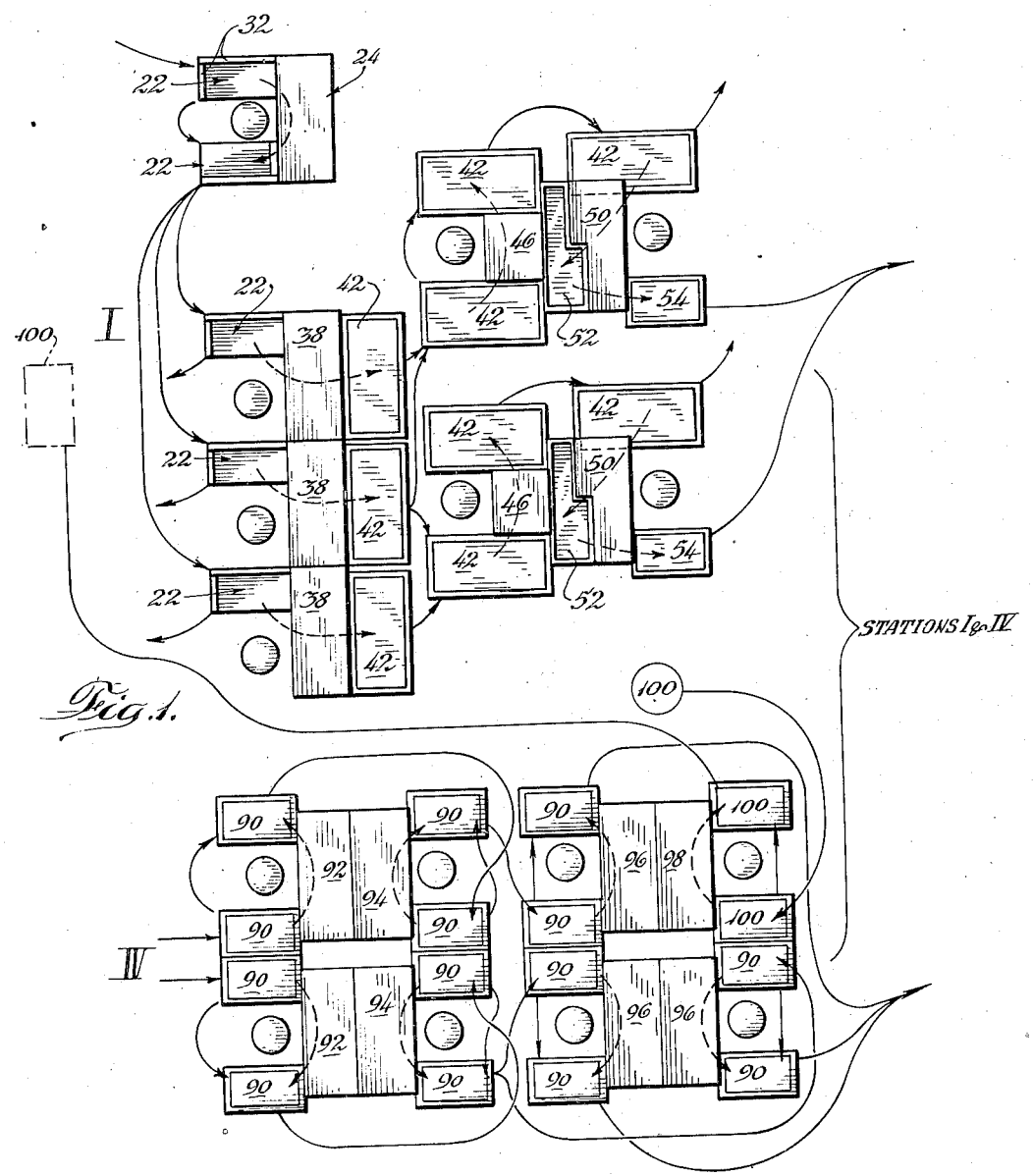
Fig. 1 is a diagrammatic illustration of stations I and IV.
Figure 2:
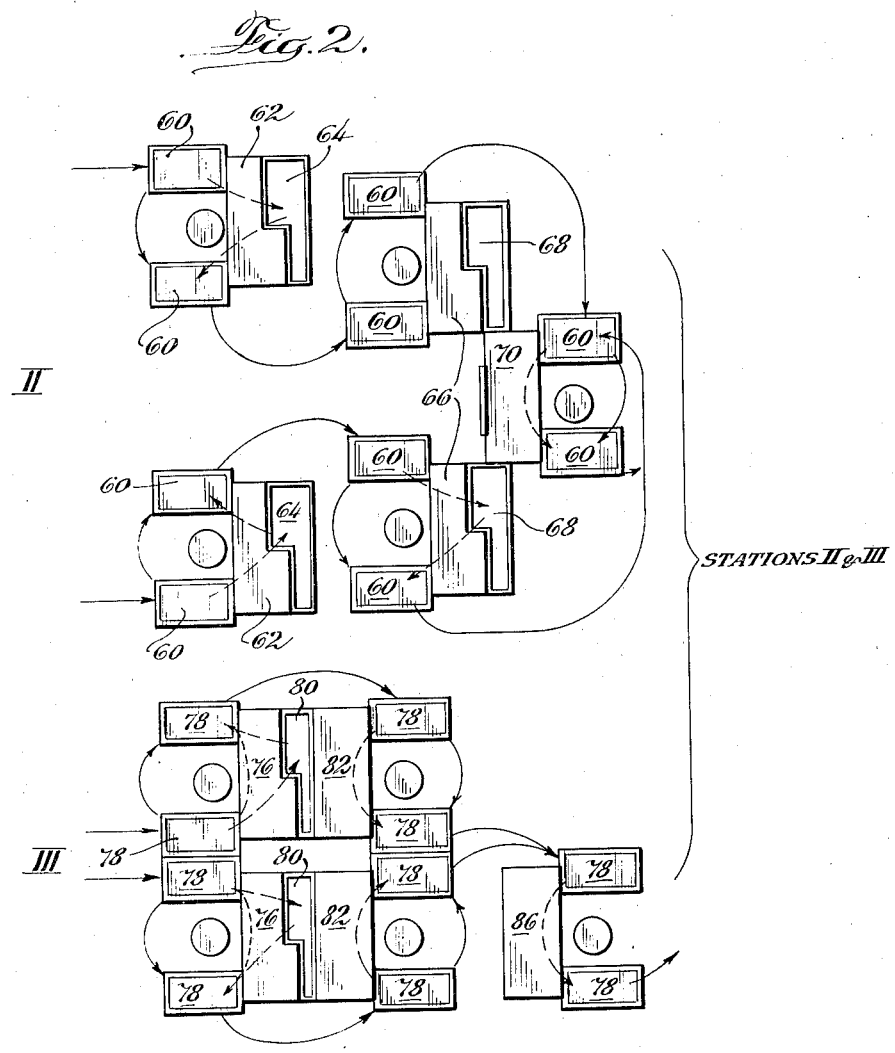
Fig. 2 is a diagrammatic illustration of stations II and III.

As previously noted the invention is concerned primarily with the sewing phase of the process of manufacturing a particular garment and, therefore, necessarily with the subsequent and simultaneous inspections and the final pressing and bundling or packaging. The manufacturing process is so divided that one operator performs a single operation or a few very related operations while the other operators simultaneously are performing other operations on the garments in a more or a less advanced stage of the process.

The drawings illustrate how our manufacturing process can be carried out on more than one level or one floor of a plant, it being obvious that all of the steps could be carried out on a single level by placing the inspecting and packaging stations immediately adjacent the finishing stations.

Our invention contemplates performing all of the cutting operations in a cutting room separate from the sewing stations and delivering to the proper units in each sewing station the cut parts required at that unit. After the sewing operation is completed on a predetermined number of the same part the sewed parts are moved to another unit in the same or in another station where a subsequent sewing operation is performed. During the process parts of the same kind and size and at the same stage are bundled together, with a certain predetermined number of each part in a bundle. These parts are matched with other parts of the same size which have been similarly bundled to complete a predetermined number of garments. A record of the bundle, size of the garment, and the number of garments accompanies the garments throughout the entire process and serves as a means of tabulating and recording the number, style, size, etc. of the garments completed.

We have illustrated our invention as applied to the manufacture of work pants but do not desire by this illustration to be limited to a particular garment or even to a particular style of pants.

In the diagrammatic views the solid lines indicate the tables, work benches, stools, chairs, trucks, racks and other apparatus required in carrying out the process. The stools and chairs upon which the operators sit are represented by circles and will not otherwise be referred to. The solid lines with the arrowheads indicate the direction of flow of parts between units and between stations while the dotted lines with the arrowheads indicate the direction of movement of the garment or parts through an operator's machine or across the work bench. A reference character enclosed within a circle in a flow line designates the mobile apparatus moving to another station; this designation is used primarily in Fig. 7. The position of the sewing machine on each table or bench is not indicated but each machine is placed for the operator's greatest convenience, and the operator works from left to right or from right to left according to the operation performed or to give the greatest mobility in the flow of partially completed garments and parts.

Stations I, II, III and IV, for convenience, may be refered to as the Accessory Division. In this division the waistbands, flys, button strips and pockets are sewed.

Figure 8:
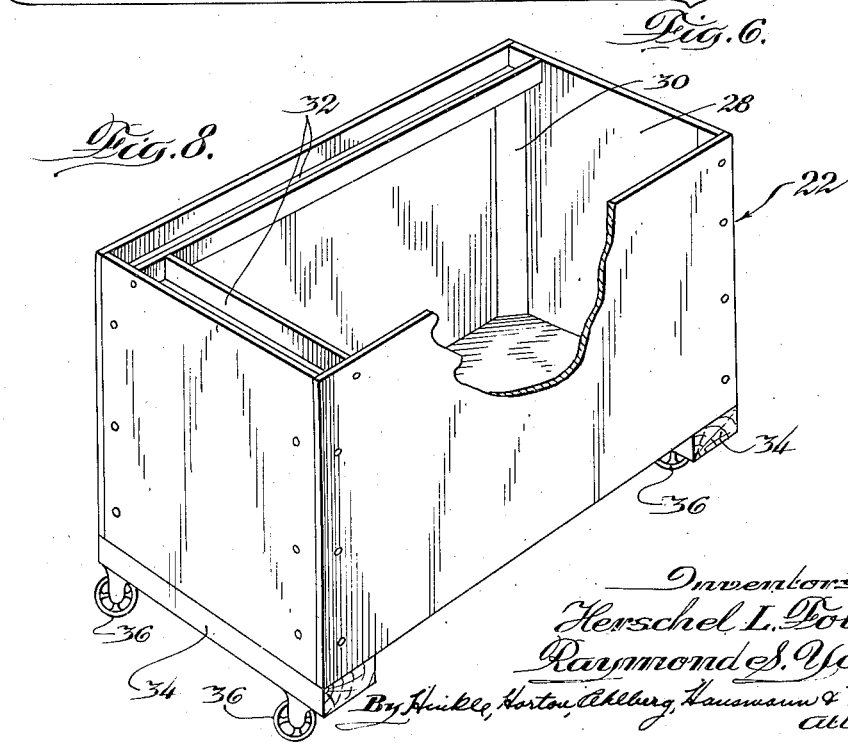
Fig. 8 is a perspective illustration of a mobile truck used in the process.

The waistband 20 is sewed at station I; a full cut of waistbands 20 is placed in a truck 22 (Fig. 8) and is wheeled to table 24 where an operator tacks a label 26 onto the outside of the waistband. The truck 22 has a body 28 of general box-like construction with the corners reinforced by strips 30 having a right triangular cross-section. Label trays 32 are fitted into the truck across two adjacent sides thereof at the top of the body. The trays 32 are relatively shallow and their bottoms rest on the reinforcing strips 30. The body is provided with a pair of cross members 34 which are secured to the underside thereof at each end and to which four casters 36 are secured so as to obtain the necessary mobility.

A full cut of bands 20 is placed in the bottom of each truck 22 with the bundles arranged in some predetermined order; the labels are placed in the label trays 32 in the same order as the bundles of bands. The loaded truck 22 is wheeled to the table 24 at the left side of the operator and is positioned with the label trays 32 at the side and back. One bundle of bands is worked on at a time and during this time is tied at one end—the end opposite to that on which the labels are tacked. The operator tacks one label 26 onto each band until a bundle is finished. The finished bundles of bands are placed in an empty truck 22 on the operator's right. When labels have been tacked to all of the bands in a cut, the truck 22 is moved from the operator's right to another operator and the empty truck 22 is moved from the operator's left to the right and another truck 22 of bands is moved into position at the operator's left.

The truck 22 which contains the bands which were tacked with the label at the table 24 is supplied with a full cut of belt loops 40 as it moves to the next operation. (The belt loops had been made previously in station IV as will be described hereinafter.) The truck 22 with the belt loops 40 in the trays 32 and the tacked bands 20 is moved to one of three tables 38 at the operator's left. The operator removes a bundle of waistbands from the truck and places them in his or her lap so that the waistbands might be run in a chain across the table 38 into a truck 42 at the rear thereof; the truck 42 is similar in all respects to the truck 22 except that it does not possess the trays 32 and is somewhat larger.

The table 38 is provided with a supply of curtain rolls which are sewed to the inner side of the waistband and form the lining 42 therefor. The operator begins the sewing operation by bringing together the proper end of the waistband 20 and the curtain roll, and positions them to the needle. The band is sewed until a place for a loop is encountered as will be indicated by suitable notches cut in the turned-in edge of the waistband. A belt loop 40 is placed at each indicated place and is retained by the stitching of the curtain roll to the waistband. The bands are sewed in a chain on the curtain roll and run into the truck 42 at the back of the table, which truck is large enough to hold the entire cut of waistbands 20. When the entire cut of waistbands has been sewed and all of the belt loops have been positioned, the empty truck 22 is removed and returned to the cutting room for another supply of bands, and a full truck is moved to the operator's left where the operation is repeated.

The truck 42 containing a full cut of waistbands 20 is moved to one of two tables 46 at the right side thereof, where the suspender buttons 48 are sewn to the curtain roll or lining 44. The operator at the table 46 works from right to left and passes the chain of bands across the table into an empty truck 42 at the left. When the full cut of waistbands has been transferred from the supply truck at the right to the empty truck at the left, the full truck is moved to the next unit and the empty truck is moved from the operator's right to left.

Figure 3:
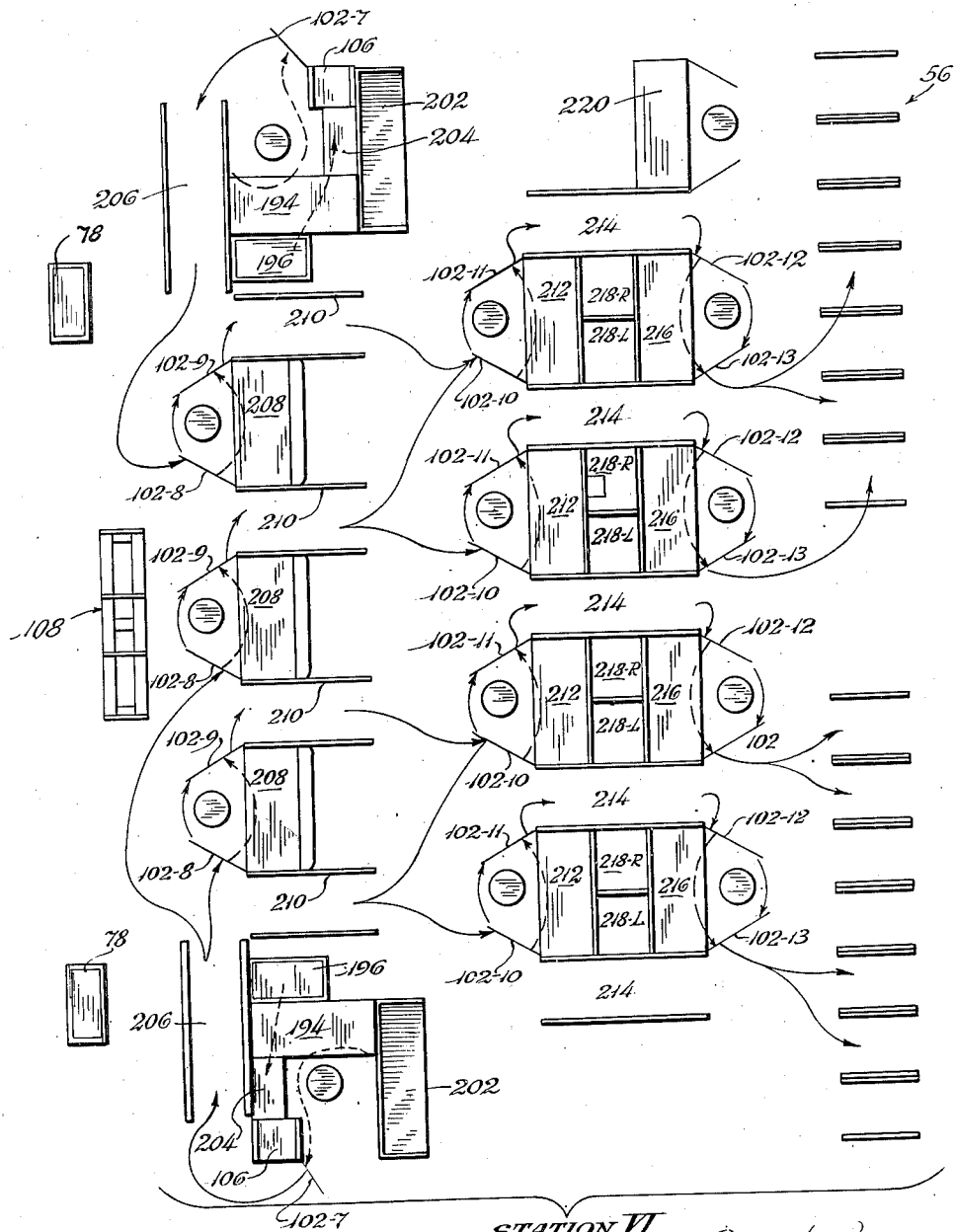
Fig. 3 is a diagrammatic illustration of station VI.

With the bands still in a chain, the truck 42 with the suspender buttons sewn to the lining 44 is moved to the right side of one of two tables 50 where the belt loops 40 are stitched to the waist band 20. The operator at this table works from the right across the table 50 and the bands are run into a bin 52 at the back of the table. When the bin 52 becomes filled with bands the operator stops the operation of sewing the belt loops to the waistband and clips apart the waistbands in the bin 52. These bands are stacked and tied into bundles and placed in a truck 54 which is at the operator's left. When a full cut of waistbands 20 has been placed in the truck 54 it is wheeled to the matcher's rack 56 (at the outlet side of station VI) (Fig. 3).

At station II the side pockets 58 are completed. All of the side pockets 58 are the same size and consequently they are cut one way, making both left and right pockets. The pocket facings are cut face to face, making both lefts and rights. The requisite number of the rights of a cut is placed in an accesory truck 60 together with a corresponding number of facings, the facings being tied in bundles equivalent to one-eighth of an entire cut. The accessory truck 60 filled with pockets and facings is wheeled to the outside of an operator sitting at a table 62. There are two tables 62 in station II and each operator works from the outside to the inside, one operator working from left to right and the other operator working from right to left. An empty accessory truck 60 is placed at the inside of the table 62, being either at the operator's right or left, depending upon which of the two tables the operator is sitting.

During the sewing operation, the pockets are sewed to the facing and are run in a chain into a bin 64 to the rear of the work table 62. When the bin has been filled with the chained pockets and facings, the operator ceases to work and cuts apart the chain of pockets and facings and stacks the faced pockets at one end of the bin. This operation proceeds until the entire supply of pockets and facings in the accessory truck from which the work proceeds is empty. At that time one-fourth of a cut of pockets will have been faced. The faced pockets are then stacked in the empty truck 60 on the inside of the worker's position, and the truck is pushed into the center aisle and moved to the next unit in station II, the operator moving the empty accessory truck 60 from the outside of the unit to the inside.

At table 66 the accessory trucks 60 with the faced pockets are moved to the inside of the operator's working position, which will be at either the operator's right or left, as the case may be. Each operator has an empty accessory truck 60 at the left or right which is the outside of the station. The operator folds each pocket and chain-stitches the folded pocket into a bin 68 to the rear of the table until the bin is full. When the bin has been filled, the operator ceases sewing, cuts apart the chained pockets and stacks them in the heretofore empty supply truck 60 at the outside of the work position. This operation is repeated as often as is necessary to finish folding and sewing the pockets which previously were faced. When the supply accessory truck 60 at the inside of the operator's position has been emptied and the pockets folded and sewn, the full truck 60 is moved into the aisle and the empty truck is moved to the outside of the operator's position.

At table 70 an operator second stitches the side pockets thus completing the pockets for the final assembly. At this table the operator works with the supply truck 60 on the right and stacks the pockets at the left end to the rear of the table 70 until the stock is so high that it becomes either necessary or desirable that the completed pockets be stacked in the empty truck 60 at the operator's left. When the accessory truck 60 has been filled with completed pockets the full truck is wheeled to station VI.

It will be noted that all during the operation of making the side pockets at station II, only one-fourth cut is moved in each truck which distinguishes from the previous operations in station I wherein a full cut of waistbands is completed into each accessory truck. This is practical because the pockets need not be matched with other parts as do the waistbands; instead, the pockets are moved to station VI where they are stored in bins until sewed to the legs. During each step of the operation of making the side pockets at station II, the operators inspect the pockets as they proceed through the station and make whatever repairs are necessary, which reduces to a minimum the number of subsequent rejections. In fact, this inspection technique is used throughout the process.

The flys 72 and the button strips 74 are made at station III, the operations being commenced at a pair of tables 76. The operator at the work table 76 receives a full cut of flys, fronts, button strips and linings in an accessory truck 78. At station III the trucks 78 are moved by way of outside aisles and consequently the operators at the tables 76 work from the inside to the outside, one operator working from right to left and the other operator working from the left to right. The flys and button strips are tied in bundles with the bundles being untied for the carrying out of each operation in this station.

At the table 76 the operator takes a bundle of flys and a bundle of fronts from the supply truck 78 at the inside. The operator first lays out the fly parts and positions them to the folder and needle on a suitable machine mounted on the table 76. The fly parts are sewed together and when a bundle has been completed it is tied and set in the empty accessory truck 78 at the right. The operator next lays out the button strip parts and positions the parts to the holder and chain sews the button strip into a bin 80 at the back of the work table. When a complete bundle of button strips has been sewed they are clipped apart and the bundle of button strips tied up. Then this bundle of tied button strips is tied to the corresponding bundle of flys and the whole bundle is placed in the empty accessory truck 78 at the outside of the operator's work table. These operations are repeated until a complete cut of flys and button strips has been completed.

The truck containing sewed button strips and flys is moved into the outside aisle and the empty accessory truck 78 is moved from the inside of the work table to the outside as indicated, and a fresh supply of fly parts and button strip parts from the cutting room is moved into position at the inside of the operator's table.

The next operation performed in station III is carried out at the work tables 82, where operators stitch the buttonholes 84. The operations at the pair of tables 82 are carried on from the outside to the inside, being from right to left for one operator, and left to right for the other operator. The operator removes a bundle of flys and button strips from the supply accessory truck 78 at the outside of the table, and clips the bundle apart, taking the bundle of flys and clipping them apart. The operator then positions a fly to the buttonhole sewing machine and stitches, shifting the fly as often as is required to sew all of the buttonholes. The completely stitched and buttonholed flys are stacked and the operation is repeated until a bundle is finished, at which time it is tied up and placed with the corresponding bundle of button strips in the empty accessory truck at the inside of the table. When a complete cut of flys has had the buttonholes stitched, the accessory truck with the full cut of button strips and flys is moved to table 86, to the right of the operator.

At this table 86 the fly is stay-tacked to the lining. There are three or four stay-tacks on each fly, and the operator works only on the flys, laying aside the bundle of button strips. This operation is comparatively short compared to the previously described operations carried out in station III, and consequently there is only one operator stay-tacking the fly to the lining, while there were two operators performing each of the other steps. When the flys have been stay-tacked to the lining the bundles are re-tied and placed in the accessory truck 78 at the operator's left. This truck is then moved to a table in station VI where the operation of setting the watch pockets is carried out, there to be matched with the fronts as will be described hereinafter.

At station IV the hip pockets 88 are made and the belt loops are stitched prior to the operation of inserting the loops, which is carried out at table 38 in station I. A one-half cut of hip pockets is placed in an accessory supply truck 90. The supply truck is also provided with an equal number of welt facings which are bundled one-eighth of a cut to a bundle. The thus supplied trucks 90 are moved to the work tables 92 where the welt facing operation is carried out. Since most of the truck movements in station IV are through outside aisles, the operators work from the inside to the outside, and in the case of the welt facing operators, one works from right to left and the other from left to right. As the operator completes welt facing pockets they are stacked on the table 92 and completed bundles are stacked in the empty accessory truck 90 at the outside of the operator's work table. When one-half cut is finished, the supply truck should be empty and the truck positioned on the outside should be filled with welt-faced pockets. The loaded truck 90 is moved into the outside aisle where a "bundle boy" adds one-half cut of hip pocket facings to the bundles of welt faced hip pockets in the truck. The empty supply trucks 90 are moved from the inside of the work tables 92 to the outside, and the welt faced hip pockets are moved to the inside of tables 94 where the operation of facing the hip pockets is carried out.

The operators working at the tables 94 work from the inside to the outside, as was the case with the immediately preceding operation. As the operation of facing the hip pocket is carried out, the bundles of faced pockets are placed in the empty truck 90 at the outside of the work benches 94. When these trucks have been filled with a one-half cut of completely faced pockets they are moved to the next unit of station IV, the tables 96, where the operation of making the hip pocket is completed. There are three tables 96, and at each table the operator works from the inside to the outside. At the completion of a one-half cut of hip pockets the full supply truck 90 is wheeled to station V where the completed hip pockets are placed in the hip pocket storage bin. The empty supply truck is moved from the inside of the operator's work table to the outside and another truck of faced hip pockets is moved into position on the inside for a repetition of the just described finishing operation.

In station IV the operation of sewing the belt loops is performed at table 98, and an accessory truck 100 containing a full cut of belt loops is wheeled into position at the operator's left, which is at the inside of the station. The operator working from left to right, runs the full cut of sewed belt loops into a box placed in the truck 100 which is then moved to a point between the tables 24 and 38, and the box of belt loops is transferred to one of the trucks 22 so that the operator at the table 38 will have a supply of belt loops to insert into the waistband. While the step of stitching the belt loops is not exactly identified with that of making the hip pockets its being in station IV gives operator balance to the station and to the division as this operator might perform one of the other operations part of the time to balance this phase of the process.

From the foregoing brief description it will be seen that in the Accessory Division the following parts of the garment are completed: the waistband at station I; the side pockets at station II; the button strips and flys at station III; and the hip pockets at station IV. These accessories are completed in approximately equal quantities so that they might be matched with corresponding parts of the garment either in another station, as in the case of the side pockets, hip pockets, flys and button strips, or at the matching racks as in the case of the waistbands.

The remainder of the process requires the use of certain special equipment, and it would be advisable at this time to describe this equipment so as not to break up the further description of the process. This equipment includes a stationary removable bar rack 102 (Fig. 11), a removable bar 104 (Fig. 12), a removable bar storage truck 106 (Fig. 9), a mobile track rack 108 (Fig. 13), and an assembly truck 110 (Fig. 10). The removable bars 104 when not in use are stored in the storage trucks 106 and are adapted to be used with the stationary removable bar racks 102 of which there are a number, with the mobile track rack 108, and with stationary track racks similar to the movable track rack 108.

The removable bar 104 comprises a plank 112 which is approximately two feet in length and about three and one-half inches in width. Adjacent each end of the plank 112 are handles 114 which are spaced from the surface of the plank by spacer blocks 116. The handles and spacer blocks are secured to the plank 112 by suitable wood screws 118. It is desirable that the removable bars 104 be planed, sanded smooth and finished so that there will be no wood slivers or rough edges catch in the garments which are placed thereupon from time to time during the process.

The stationary removable bar rack 102 is adapted to support a single removable bar 104 and comprises a pair of standards 120 secured to floor-engaging planks 122 which form the base therefor. The standards are braced laterally by a pair of connecting bars 124 at either side thereof and by a central third connecting bar 126 at the base thereof; the lower edge of the bar 126 rests upon the upper faces of the base planks 122. The standards 120, the base members 122, and the lateral bracing bars 124 and 126 are preferably made of wood and are screwed together in a rigid assembly. At their upper ends the standards 120 which are substantially wider than the width of the removable bar 104 are notched at 128 to provide recesses for the reception of a removable bar. The distance between the outside faces of the standards 120 is only slightly greater than the length of the removable bar 104 which is adapted to rest on the upper edges of the standards, the bars 104 being prevented from lateral movement by the lips 130 at either end of the recesses. In order to prevent longitudinal movement of the removable bar and thus to prevent it from slipping off the standard 120 the recesses are closed by a pair of facing blocks 132 which are screwed to the outer faces of the standards 120 with their upper edges flush with the upper edges of the lips 130. At several of the work tables in the stations to be described hereinafter, one of these stationary removable bar racks 102 is provided at either side of the operator's work bench so as to provide a temporary resting place or support for the removable bar 104. The rack 102 is approximately twenty-seven inches high and is, therefore, at a convenient height for the operator who is sitting on a stool before a work table.

The mobile track rack 108 is used as a carriage or truck for moving a plurality of removable bars 104 and includes a pair of longitudinal base members 134 which are connected by three connecting blocks 136 placed at the ends of the members 134 at their centers. Four casters 138 of suitable size and design are fastened to the underside of the base comprised of the members 134 and blocks 136 to give mobility to the rack 108. The rack also includes a number of tubular uprights 140 which may be made of standard pipe and are secured to the upper surface of the base by floor flanges or feet 142. The feet 142 are provided with a centrally threaded boss upstanding from the flange, the flange having suitable holes through which securing screws may be driven. The tubular uprights are arranged in transverse pairs equidistantly spaced along the base members 134. Suitable angle members 144 are welded to the upper ends of the uprights 140, the angles being so arranged that their open sides face each other. The two center pair of uprights 140 each support a pair of angles 144 positioned back to back with their vertical flanges preferably spotwelded together. The distance between the internal faces of the upright flanges is only slightly greater than the length of a removable bar 104, and, therefore, is adapted to support one or more of these bars on the horizontally disposed flanges. The stationary track racks are similar to the mobile track rack 108 except that the uprights in these racks corresponding to the uprights 140 are provided with floor flanges similar to the floor flanges 142 which are secured directly to the floor.

The removable bar storage truck 106 (Fig. 9) comprises a box-like base 146 which is formed of four vertical walls 148 and a plywood bottom 150. The four walls 148 and the plywood bottom 150 are secured to each other and to vertical corner posts 152. The corner posts are connected along opposite sides by a pair of top rails 154 secured by suitable screws to the upper ends of the posts 152. Looking at the storage truck 106 from one end an open side is seen, while looking at it from an adjacent edge it will be seen that the side is closed by the rails 154. The removable bars are stored in the removable bar storage truck by placing them across opposite walls 148 at the open ends of the truck. It is desired that this truck be mobile and for that purpose suitable casters 156 are secured to the bottom of the truck 108 at each of the four corners.

The assembly truck 110 (Fig. 10), comprises a substantially square plywood base 158 which is approximately three-quarters of an inch thick, a pair of uprights 160 secured to the base at opposite sides thereof, a reinforcing bar 162 and an upper bar 164. The reinforcing bar 162 is set on edge with the long edge resting on the upper face of the plywood base 158. Screws 166 secure the uprights 160 to the reinforcing bar 162 and other screws (not seen) secure the reinforcing bar 162 to the plywood base 158. The uprights 160 taper inwardly beginning at a point slightly above the reinforcing bar, and the upper bar 164 is the full width of the tapered portion of the uprights 164 and is secured thereto by screws 168. Casters 170 are bolted to the under side of the base 158 and are spaced sufficiently close to the outer edges of the uprights 160 so as to insure rigidity in the base of the assembly truck.

The purposes and the uses of these particular pieces of apparatus will become fully apparent from the further description of the manufacturing process.

Figure 4:
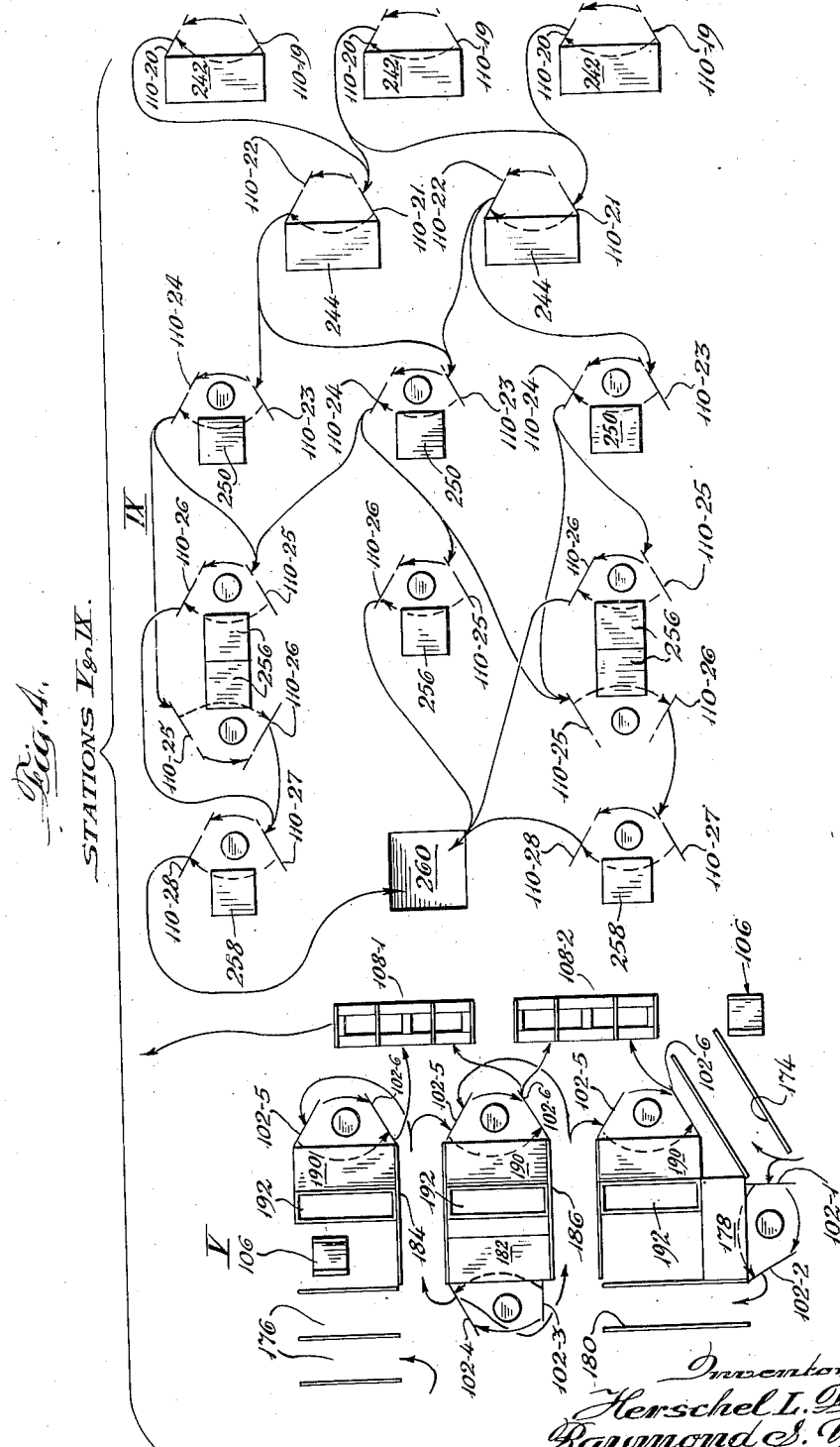
Fig. 4 is a diagrammatic illustration of station V and station IX.
Figure 5:
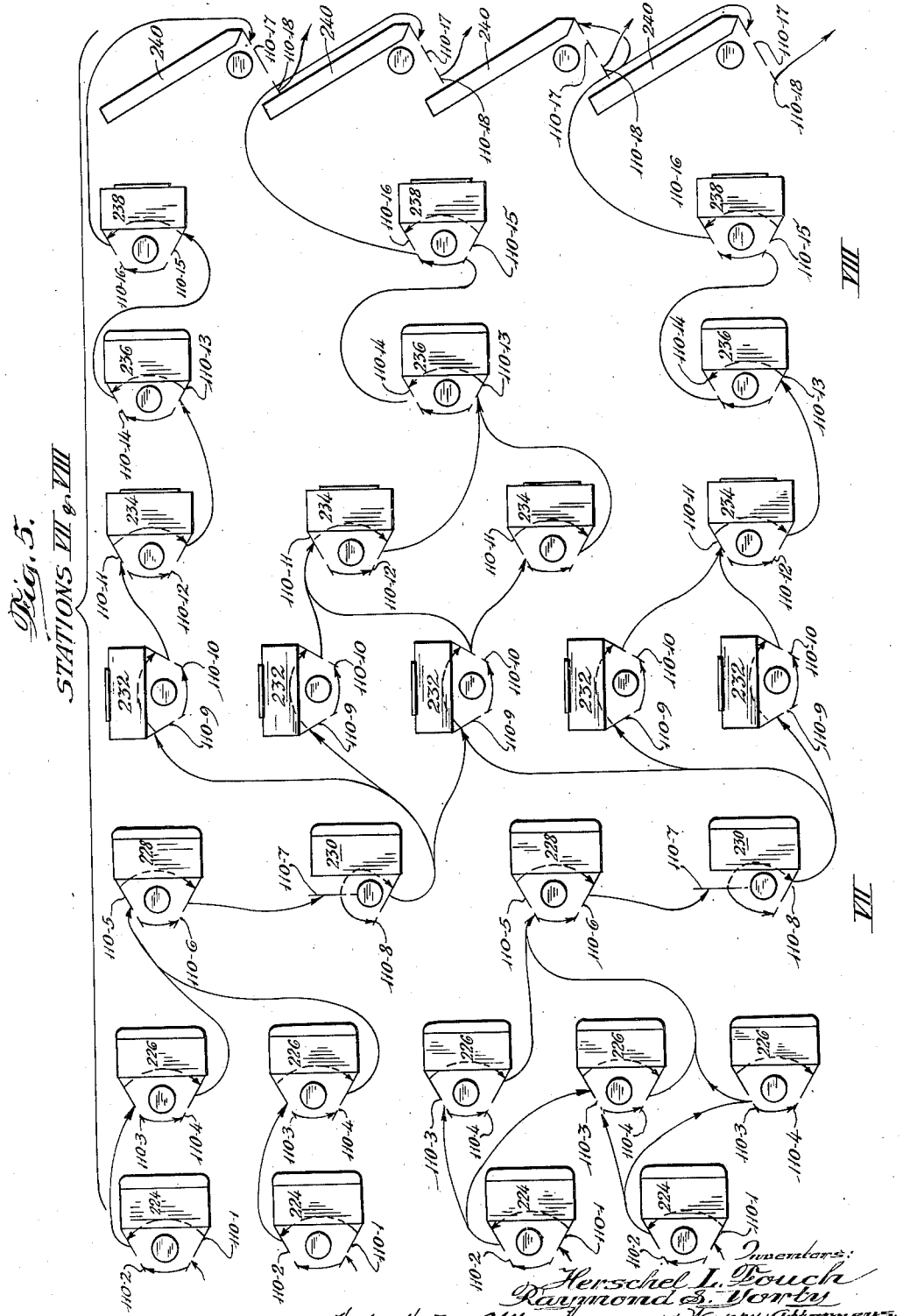
Fig. 5 is a diagrammatic illustration of stations VII and VIII.

At station V (Fig. 4) the back legs are completed for matching on the match racks 56 with the front legs and the waist bands. This station may be referred to, for convenience, as the "Back Legs Division." Fig. 5 shows only one station, but in order to obtain a proper balance of the work three identical stations in the Back Legs Division are used as indicated in Fig. 7. The backs 172 of the legs are cut face to face as they are identical and they are bundled four dozen to each bundle. This number in a bundle is not critical but it has been found in practice to be a convenient number and the bundles are not too large for handling nor are they so small that the operator has to stop frequently to change bundles, which is a time consuming factor.

The bundles of back legs 172 are brought from the cutting room, and a rack bar 104 is placed between the fold of each bundle at the bottom of the gore point. Those legs which require goring are supplied with gores and are placed on the rails of the stationary track rack 174. The legs which do not require gores are likewise folded over removable bars 104 and are placed on the rails of the stationary track rack 176. The service boy who unloads the trucks of back legs 172 obtains the removable bars 104 from the removable bar storage trucks 106 which are usually placed next to the stationary track racks 174 and 176.

The gores are sewed at the work table 178, and the operator at that table is supplied with a bundle of back legs 172 to be gored on the stationary removable bar rack 102—1. An empty removable bar 104 is already in place on the stationary removable bar rack 102—2. (In Fig. 4 and in other figures to follow, the position of the removable bar racks 102 at the sides of the operator's work tables will be indicated by a single line to which a reference character is applied. This representation is used for simplicity of illustration.) The operator removes the back legs 172 from the bar on the right and sews the gores placing the gored legs on the removable bar 104 at the left. When a bundle has been completed the operator removes the bundle and bar over which it is folded and places them upon a stationary track rack 180 at the left of the table 178, then transferring the empty removable bar 104 from the rack 102—1 to the rack 102—2. This operation is repeated until a full cut of the back legs 172 is ready for the next operation, the full cut being placed upon either of the stationary track racks 176 or 180. The bundles move through the racks 176 and 180 and the other racks positioned throughout the sewing room by sliding them from the inlet to the outlet end.

Since the operator at the table 178 will not be kept busy all of the time, because all of the legs 172 in a cut will not require gores, this operator overcast stitches the watch pockets. The watch pockets have previously been faced by an operator in station VI as will appear hereinafter. The faced watch pockets are brought to the operator in the watch pocket assembly truck which may be similar to the trucks 42, and the truck is placed at the operator's right; an empty truck is moved to the operator's left. A full cut of faced watch pockets will be in the watch pocket assembly truck, and when this cut has been overcast stitched it is placed in the truck which is then moved to an operator in station VI who sets the watch pockets. The operator at the table 178 alternates work between goring the necessary back legs 172 in a cut of back legs and overcast stitching a cut of watch pockets. In this way a single operator at the table 178 will be kept busy the full time. It may not be necessary to have three operators goring the back legs and overcast stitching the watch pockets in the Back Legs Division, and in some instances only two operators may be required to perform these two operators.

The operator at table 182 overcast stitches the back legs 172 and is supplied with bundles of back legs from both the stationary track racks 176 and 180. A removable bar 104 supporting a bundle of back legs for overcast stitching is placed upon the removable bar rack 102—3 at the operator's right. The operator, working from right to left, overcast stitches a bundle of back legs placing them upon a removable bar 104 on the rack 102—4. When a bundle has been completed it is placed upon either of the stationary track racks 184 or 186 while the empty removable bar 104 is transferred from the rack 102—3 to the rack 102—4.

The next operation to be performed in this division is the stitching of the darts 188 and the setting of the hip pockets 88. These two operations are performed at table 190. As has been previously described, the hip pockets 88 were made in station IV of the Assembly Division and were moved in the trucks 90 to the Back Legs Division. They are removed from the trucks 90 and stored in bins 192 at the back of each table 190. It is the duty of the service boy in this division to see to it that the bins 192 are constantly stocked with completed hip pockets 88 so that the operators at the tables 190 will not need to cease working because of a lack of hip pockets. The operator obtains the back legs from either of the track racks 184 and 186 and places the removable bar 104 on the removable bar rack 102—5 at the left. The operator works from right to left, first stitching the darts 188 and then setting the hip pockets 88, stacking the back legs so completed on a removable bar 104 placed upon the rack 102—6. The completed bundle of legs is moved to one of the two mobile track racks 108—1 and 108—2. When a mobile track rack 108 has been filled with back legs 172, it is moved to the matching racks 56 to be matched with the front legs and the waist bands 20. It will be seen from Figure 7 that the arrangement of the Back Legs Division relative to the Front Legs Division, station VI, is such that the exits from these two divisions are very close to the matching racks 56 which are indicated as being in the right hand side of station VI (Fig. 3).

Station VI may be referred to as the Front Legs Division and the operations performed therein are directed toward the completion of the front legs for matching with and joining to the back legs which have been completed in the Back Legs Division, the operations of which have just been described. The watch pockets—subsequently to be overcast stitched at table 178—are faced in the Front Legs Division at one of the two tables 194. At the time a cut of front and back legs is sent from the cutting room, a full cut of watch pocket parts is also sent. They are first sent to the operator at tables 194 where the watch pocket is faced and placed in a truck 196. The empty truck will be at the operator's left and the supply truck at the right. When a full cut of watch pockets has been faced it is wheeled in truck 196 to the operator at one of the three tables 178 for overcast stitching.

Figure 6:
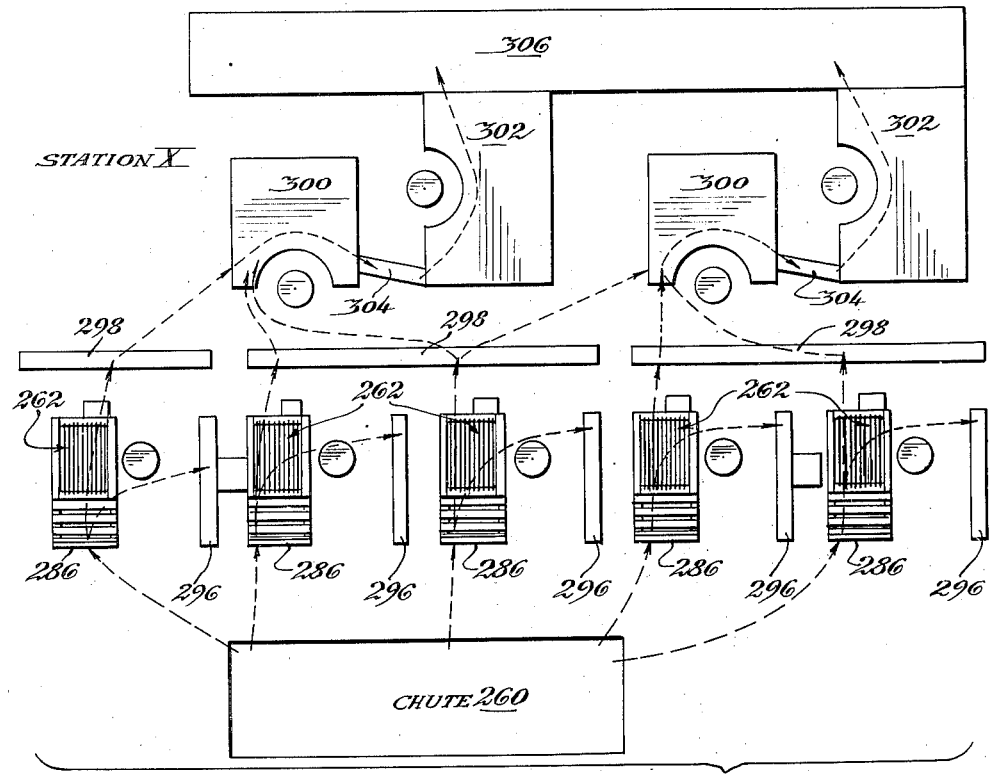
Fig. 6 is a diagrammatic illustration of station X.

After completion of the overcast stitching of the full cut of watch pockets, the truck 196 is moved to the back of the table 194 as indicated in Fig. 3, from which the operator is supplied with watch pockets for setting into the right front leg 198. While not specifically shown in Fig. 16 because of the positioning of the upper portion of the right front leg, the watch pocket is placed in the customary position in the upper portion thereof. The front legs 198 and 200 come from the cutting room, face to face, and bundled in the same count as the back legs, in our illustration four dozen to a bundle. The front legs are placed in a bin 202 at the side of the operator's table 194. This bin 202 is large enough to contain an entire cut of front legs 198 and 200. The operator selects a removable bar 104 from the removable bar storage truck 106 which is placed under the table at the left. In Fig. 6 the storage truck 106 is indicated as being somewhat behind the operator's position. Actually it will be placed under a table extension 204 in order to save room. The removable bar is set on legs or on a rack 102—7 and as a bundle of legs has the watch pockets set into the right leg 198 the bundle is placed upon the removable bar on the rack 102—7. The operator at table 194 with a quantity of watch pockets on the table extension 204 works from right to left, obtaining the front legs from the bin 202 and the watch pockets from the supply truck 196 as needed. When a bundle has been completed it is moved to the track rack 206 at the operator's left or right (there being two tables 194). As the bundles on the track rack progress toward the next operation, the service boy matches the bundle with flys and button strips from the truck 78. This truck had previously been moved to station VI from station III of the Accessory Division.

After the flys and button strips have been matched with the fronts 198 and 200 and placed upon the racks 206, the fronts are ready for overcast stitching which is done at one of the three tables 208 which are placed between the two facing tables 194. The operator at one of the tables 208 takes a bar 104 containing a bundle of fronts, button strips and flys and places them on the removable bar rack 102—8 at the right side of the table. The fly and button strip bundle is laid aside on the table top and the edges of the front legs 198 and 200 are overcast stitched, the operation moving from right to left across the table. When a bundle has been completed it is placed on a removable bar 104 on the rack 102—9 at the left of the operator and the fly and button strip bundle is placed on top of the bundle of fronts. The bar 104 containing these bundles is then transferred to one of the track racks 210 at either the right or the left of the tables 208 and the empty removable bar 104 is moved from the rack 102—8 to the rack 102—9.

The operators at the table 212 sew the flys 72 to the fronts 200 and the button strips 74 to the fronts 198. The bundles of fronts, flys and button strips are obtained from one of the racks 210 placed upon a stationary bar rack 102—10 at the right of the operator's table. The flys and button strips are laid out on the top of the table 212 and the operator alternately sews a fly 72 to the left leg 200 and then a button strip 74 to the right leg 198, thus completing the legs in alternate lefts and rights. The completed legs are stacked upon a removable bar upon the stationary rack 102—11 at the left of the operator's table. When a bundle of flys and button strips has been stitched to a bundle of leg fronts, the removable bar containing the complete bundle is placed upon one of the stationary track racks 214 at either the right or the left of the table 212. The empty removable bar 104 is transferred from the rack 102—10 to the rack 102—11 and the operator obtains another bundle of flys, button strips and fronts from the racks 210.

Between tables 212 and 216 are bins 218 in which the side pockets 58 are stored when moved from station II. These side pockets when completed had been placed in the truck 60 and wheeled to station VI, the trucks 60 being emptied into the bins 218 and the empty trucks returned to the cutting room where they are loaded with bundles of cut side pockets. Since there are both right and lefts to the side pockets 58, they are placed in separate bins as follows: the right pockets in bin 218—R and the left pockets in bin 218—L. The side pocket operators obtain a bundle of fronts from one of the racks 214 and place the bar and bundle on a stationary rack 102—12 at the right of the work table. The operator working from the right to left and sewing alternately on left and right legs 200 and 198, respectively, obtains the side pockets from the bins 218—L and 218—R, respectively, for sewing to the proper leg. When the side pocket has been sewed to the leg, the latter is laid across a removable bar 104 on rack 102—13 at the left of the operator's table. When a complete bundle has been sewed, the removable bar is placed upon one of the matching racks 56 and the empty removable bar 104 is moved from the rack 102—12 to the rack 102—13, and the operator is ready to repeat the same operation on another bundle of fronts.

Since the work in station VI is very heavy, it is possible that the balance of work may become upset and one operation will fall behind somewhat in keeping up with the quantity of bundles that are flowing through the process. Consequently, an extra table and machine 220 are provided in this station, at which an extra operator may sit from time to time to perform the operation which has fallen behind the flow of garments through the process.

The matching racks 56 are on the outlet side of station VI, and in Fig. 7 are represented as being a portion of this station. Between stations VI and VII is an aisle 222 which is used for storing the assembly trucks 110. Throughout the process as it has proceeded up to the present stage each bundle is accompanied by a bundle ticket which gives complete information regarding the size and style of the garment to which the part such as the front, back or waistband is to be attached. When the various components of the garment reach the matching racks 56 the tickets serve as an identification to assist in the proper matching of the front legs, back legs and waistbands. The stationary matching rack 56 is loaded with fronts from the side pocket operators in station VI. The waistbands are brought to the matching racks 56 in the mobile trucks 54 and the fronts are brought to the racks on the mobile track racks 108. The matcher places a bundle of backs 172 across the top bar 164 of an assembly truck 110 and moves the assembly truck to a corresponding bundle of fronts 198, 200 on the matching racks 56. The fronts are laid next to the bundle of backs across the same bar so that the bundles of fronts and backs are side by side on the assembly truck 110. The corresponding bundle of waistbands 20 is selected from a truck 54 and placed across the top of the bundles of fronts and backs, and the assembly truck is moved to a position behind the operators who join the front and back legs together in station VII.

The matcher returns the mobile track rack 108 to one of the stations V and the truck 54 to station I. The empty rack bars 104 are distributed to the various rack bar supply trucks 106 so that they will be available for subsequent operations The matcher can save a considerable amount of time in this process by following the work through the Front and Back Legs Division so that he will at all times know which cuts of front and back legs are coming through the respective divisions, making it a simple matter to match these fronts and backs together.

The assembly trucks 110 bearing bundles of garments are wheeled through the Assembly Division, stations VII and VIII, under the guidance of a service boy who makes certain that the trucks 110 move between the individual units of the division so that no operator will lose time and so that a number of trucks 110 do not collect at one point in the division causing what might be called a "traffic jam."

After the bundles of fronts, backs and waistbands are matched and placed upon the assembly trucks 110, they are wheeled to a point immediately behind the tables 224 in station VII. The operators at these tables sew the side seam between the fronts 198, 200 and backs 172 of the legs. A truck 110 is wheeled to position at 110—1 at one of the tables. The operator selects front and back legs from the bundles on the bar of the truck 110 and sews the side seam joining a front to a back, taking care to match lefts and rights. The thus sewed fronts and backs are placed on a truck 110 at position 110—2 at the left, the operators working at units from right to left. When a bundle has been sewed and the waistbands placed on top of the bundle of fronts and backs, the truck 110 is moved to the left side of one of the tables 226 at position 110—3 and the empty assembly truck 110 is moved from the right to the left of table 224.

At tables 226 the operators run on the waistband; that is, they sew the waistbands 20 to the tops of the fronts and backs which previously were joined at the tables 224. The operators at the tables 226 work from left to right and commence the operation by placing the lefts and rights of the bands in a holder on the top of the table. The legs are removed as needed from the bundle on top of the truck 110 at station 110—3 and after the band has been "run on" the legs are placed upon an empty assembly truck 110 at the right side of the table at position 110—4. This operation is continued until all of the fronts and backs have had a waistband sewed to the top thereof, care being taken throughout the operation to match the right and left side of the pants with the proper right and left waistbands. A completely loaded truck is moved from the right side of the tables 226 to one of the two tables 228 and the empty assembly truck 110 is moved from position 110—3 to 110—4.

At the tables 228 the operator working from left to right picks up both legs from a truck at position 110—5 and overcasts the inside edge of the fly 72 and the end of the waistband 20, the edges of which match after the left portion of the waistband has been sewed to the left side of the bands. The operator at the table 228 is responsible for matching the left and right halves of the pants and is also responsible for properly stacking them upon an assembly truck 110 at position 110—6 so that the operator at the next table 230 will have no difficulty in selecting rights and lefts for joining in the back. A completed bundle is stacked upon the assembly truck 110—6 and moved to position 110—7 at the left side of table 230. The operator at table 230 working from left to right sews the backs of the legs together beginning at a point below the waistband and running to the crotch. The joined legs are laid over an assembly truck 110 at position 110—8 until a complete bundle has been finished. At that time the truck 110 is pushed around the right side of the table 230 and the empty truck is moved from the position 110—7 to 110—8.

The last operation in station VII is that of stitching down the bands 20 and is performed at the table 232 of which there are five. The assembly trucks 110 are wheeled into position 110—9 at the left of the tables 232. The operator working at the end of the waistband adjacent the button strip 74 turns the button strip end in and folds the lining, placing a temporary "clothes pin" clamp to hold the parts in position while the garment is being positioned at the needle of the sewing machine. The waistband 20 is sewed down and back-tacked at the button strip end. After this operation the pants are placed upon the empty assembly truck 110 at the right of the operator in position 110—10.

The assembly trucks 110 from station VII are moved to the left side of tables 234, position 110—11 in station VIII. At this table an operator stitches down the flys 72 and closes the fronts by bringing the fly 72 and button strip 74 together above the crotch to close the front. The operator commences the operation at the top of the fly and back-tacks a short distance at the start, sewing down the fly toward the crotch. During this operation the operator works from left to right and stacks the pants so completed on an empty truck 110 in position 110—12 at the operator's right. An assembly truck 110 with a full bundle of pants is moved from the table 234 to one of the three tables 236 at the right side thereof, position 110—13.

At the table 236 an operator sews the in-seam, working from right to left, placing the completed bundle on a truck 110 in position 110—14. Between the end of the button strip 74 and the fly 72 and the middle of the crotch there is a small section which has not been joined. The in-seam sewing closes this gap. With the in-seam sewn the completed bundle is moved to table 238 and the empty accessory truck 110 is moved to the position 110—14 at table 236.

The reinforcing sewing is done at table 238, and the assembly truck 110 with a bundle of pants is moved from position 110—14 to position 110—15 at the right of the table 238. The operator picks up the pants, folds a garment and sews the reinforcing stitching across the sides and ends, stacking the garment on the empty accessory truck 110 at the left of the table 238 at position 110—16. At the completion of the bundle the accessory truck is moved from position 110—16 to one of the four pressing bucks 240.

The assembly trucks 110, i. e., the supply truck with a bundle of garments and an empty truck, are placed side by side at the right end of the pressing bucks 240 with their adjacent standards 169 abutting in the positions 110—17 and 110—18; the supply assembly truck occupies position 110—17 and the empty assembly truck position 110—18. The seam pressing operator removes the pants from the assembly truck, places them upon the pressing buck 240 and presses all of the seams in the pants that have been sewn up to this stage in the process, thus making the further operations simpler to perform. As each pair of pants is seam pressed it is laid over the bar 164 of the empty assembly truck at position 110—18. At the completion of the pressing of a bundle of pants the assembly truck in position 118 is moved to station IX for the final sewing operations and the empty assembly truck 110 is moved from position 110—17 to 110—18. It may not be necessary in the Assembly Division to use four seam pressing operators. However, four pressing bucks 240 should be provided so that this operation will not slow down the complete process of manufacturing the garment.

The assembly trucks with the pressed pants thereon are moved to the Hem and Automatic Machine Division, station IX, and first to one of the two tables 242 in this division at position 110—119 where an operator sews the hem at the bottom of the legs. All of the operators in this division work from left to right with the supply assembly truck 110 at the left and an empty assembly truck 110 at the right. At the completion of the hem-sewing operation the assembly truck 110 is moved from position 110—20 to position 110—21 at one of two tables 244 where an operator reinforces the buttonhole 246 in the waistband at the top of the fly and the buttonhole 248 at the left hip pocket. With these buttonholes made the operator stacks the pants on an assembly truck at position 110—22 and this truck is moved to one of the three tables 250 where an operator sews on all of the buttons; that is, the buttons 252 on the button strip 74 and the button 254 at the left hip pocket. During the button sewing operation the assembly truck 110 is at position 110—23 and the pants with all of the button sewed onto it are stacked on an empty assembled truck at position 110—24. At the completion of the button sewing operation the assembly truck is moved to one of the five tables where the bar tack operations are carried out.

The bar-tack sewing is done at any place in the pants where an excessive amount of strain is to be placed upon the garment, for example at the ends of the welt facing on the hip pockets 88, the lower edges of the side pockets 58, the ends of the watch pockets, and the point where the button strip 74 and fly 72 are joined together. Since there are so many points where bar-tacking is required, five tables are provided for this operation, with the operators being supplied from an assembly truck at position 110—25 and placing the garment on an assembly truck at position 110—26.

Some of the pants will require cuffs and others will not. Those that require cuffs will have the cuffs tacked at the tables 258. The cuff-tacking operators work from left to right with the supply truck at station 110—27 and the empty truck at position 110—28. The cuff-tacking operation is a comparatively simple one and does not require the time of a very great number of operators.

When an assembly truck is loaded with a bundle of completed pants it is moved to the chute 260. Those pants which do not require cuff-tacking are moved directly from the bar-tack operator to the chute 260. At the chute 260 a service boy removes the bundle from the assembly truck 110, ties the pants together and drops them down a chute to a lower floor in the plant for inspection, final pressing and checking. The empty accessory trucks 110 are moved to the accessory truck storage space 222 between stations VI and VII.

In those manufacturing plants where the sewing room is on the same floor as the Inspection Division, this latter division may be placed alongside station IX but the bar-tacking and cuff-tacking operation should be carried out as close to the storage space 222 as possible so that the empty assembly trucks 110 can be moved to this storage space with a minimum amount of effort and time and without being wheeled through one or more of the other divisions.

Figure 14:
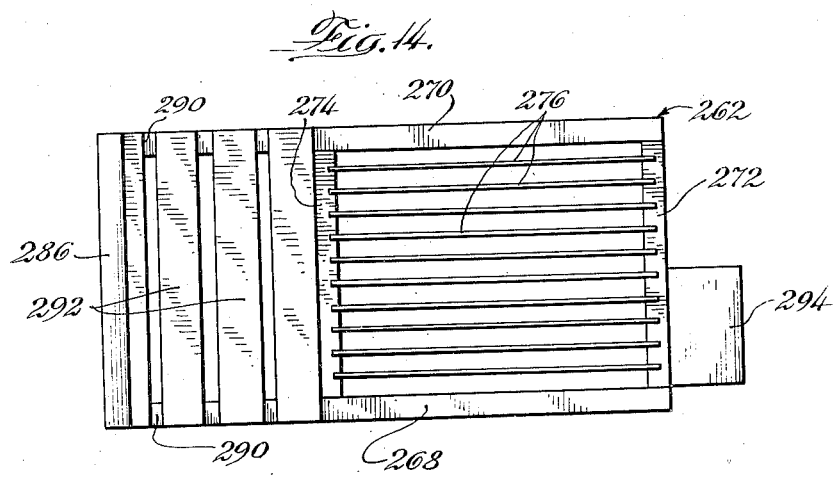
Fig. 14 is a plan view of an inspection table.
Figure 15:
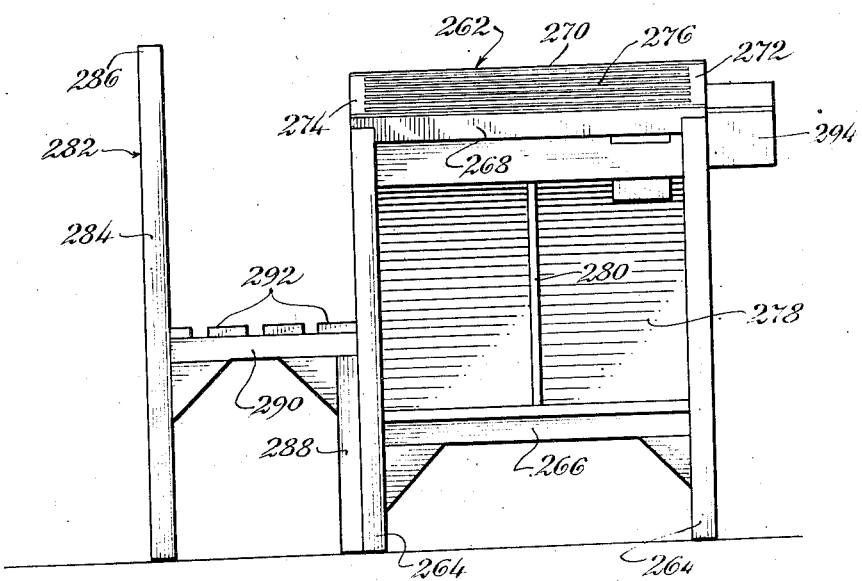
Fig. 15 is a front view of the table illustrated in Fig. 14.

In the last division the operations of trimming, inspecting and final pressing, and if desired, packaging of the pants are carried out. Adjacent the chute 260 are placed a number of trim and inspection tables 262. These tables are illustrated in Figs. 14 and 15 and include a plurality of legs 264 braced by suitable cross bars 266. The upper work surface is formed by a frame comprising four members 268, 270, 272 and 274, to which are secured a plurality of transverse bars 276 which are seated in suitable recesses in the side members 272 and 274 of the frame. The back legs 264 are somewhat higher than the front legs so as to permit the work surface to be slanted. The work surface is open, being formed of the frame and the bars 276, so that the trimmed-off threads and pieces of cloth will drop through the table top to a slanting board 278 which extends from the upper front of the inspection table 262 at a point beneath the table top to the lower rear of the table, being supported by diagonal supporting members 280 and the rear cross bar 266.

A chair-like rack 282 forms the left portion of the inspection table and includes a pair of vertical legs 284 which extend higher than the top of the inspection table and which are connected at their upper ends by a cross bar 286. A pair of shorter legs 288 are secured to the adjacent table legs 264 and are joined at their upper ends by connecting members 290 to the legs 284. The members 290 are in turn connected by a plurality of members 294 forming a seat-like surface between the bar 286 and the work surface of the inspection table. This surface 292 is lower than the bar 286 and the work surface and is used for the storage of the reserve bundle of completed pants, the purpose of which will appear presently.

The service boy for this division removes a bundle of pants from the chute 260 and lays the pants across the bar 286 at the left end of the inspection table; a reserve bundle is already in place. The inspector unties the bundle and transfers the pants one at a time to the work surface of the table. The record ticket which has accompanied the pants is placed in a box 294 which is fastened to the right side of the inspection table 262. The pants are inspected and all of the loose threads and excess pieces of cloth are trimmed off falling through the open surface of the table to slide down the slanting board 278 to the rear of the table. If any repairs are required, a repair ticket is made out and attached to the pants and they are thrown over a rack 296 at the rear of the inspection table. If the pants do not require repairing, they are laid over a bar 298 between the inspection tables 262 and the pressing tables. When a bundle has been completely inspected, the inspector checks the number of pants rejected in the bundle and removes from the reserve bundle an equal number of pairs of pants, inspecting them and placing them, if they need no repairs, over the bar 298. When a completed bundle, filled with the necessary pants from the reserve bundle, has been inspected and sent to the pressing tables, the inspector so marks the record ticket which has accompanied the bundle through the sewing room operations and attaches it to the bundle.

The pants which were rejected as requiring repairs are removed from the bars 296 and sent to a repair station. It is advisable that the repair station be set up in the Inspection Division and be provided with the necessary machines, usually a single needle machine and a button sewing machine. The repair can thus be made in the Inspection Division and the repaired pants placed with the reserve bundle at the inspection table 262. It has been stated previously in the specification that throughout the entire process each of the operators will watch for defects which may have been made in a previous sewing operation, and will repair those defects, if possible, at his or her table. This procedure should minimize the number of pants rejected in the Inspection Division as requiring repairs of one sort or another. Since the repairs required are kept at a minimum, it is not necessary to return the pants to the particular station which is charged with the performance of the operation which resulted in the defect. This removes the necessity of interrupting the sewing operation on a complete cut or a predetermined fraction of a cut in any station engaged in carrying out the process and allows a continuous flow of garments through the divisions.

Two separate pressing operations take place in this division. The first operation is pressing the top of the pants, and takes place at table 300; the second pressing operation is that of pressing the legs, and takes place at table 302. The operator at table 300 removes a bundle of pants from a bar rack 298 and places it upon the supply rack adjacent the table 300. At the completion of the top pressing operation the pants are laid over the rack 304 between tables 300 and 302 so that the leg pressing operator can remove the bundle to press the legs and fold the pants. The bundle ticket upon which is recorded the sewing and pressing operations is placed upon the bundle which is placed upon the sorting and bundle table 306 by the leg press operator. The sorters working behind the table 306 sort the pants into the proper bundles, which are suitably secured; the ticket record of the entire operations is secured thereto and the bundles passed on to a package station or to the shipping room, as may be required.

Throughout this entire process we have attained a balance in the work so that various operations are performed simultaneously with substantially no lag in any division or in any station. An examination of the diagrammatic layouts of each station will show that relatively little room has been alloted for the storage of partially completed garments awaiting a subsequent operation. The various points of entrance into the sewing room have been arranged so that the service boys in moving the trucks of cut parts from the cutting room to the sewing room will not interfere with the trucks and mobile racks moving between units, stations and divisions in the sewing room. This eliminates a substantial amount of confusion in the sewing room and insures a more efficient handling of the garments as they pass through the successive sewing operations. The separation of the sewing room from the cutting room also eliminates confusion and improves efficiency even though these rooms be separated only by imaginary dividing lines, since there is, therefore, no comingling of cutting and sewing operations.

While we have described our invention with reference to a method of making pants, it will be clear to those skilled in the garment manufacturing art, that our methods may be used in the mass production of other garments where a large number of sewing operations must be performed. As examples of these garments we might mention men's suit coats, overcoats and shirts. Furthermore, slight changes might be made in our process and apparatus without departing from the spirit and scope of our invention. It is, therefore, our desire to be limited only by the scope of the appended claims.

What we claim as new and desire to secure by United States Letters Patent is:

1. The method of manufacturing garments on a mass production scale from the cut parts of the garment comprising the steps of supplying an equal number of each of the garment parts substantially simultaneously for sewing, separating the parts according to the portion of the garment into which the part is to be sewed, sewing the parts into subassemblies, inspecting the sewed parts after each sewing operation and immediately repairing discovered defects, moving the sewed subassemblies to a matching station, matching the subassemblies for garments of the same size and style, sewing the subassemblies together so as to form the completed garments, and finally inspecting the completed garments and repairing the discovered defects.

2. The method of manufacturing garments on a mass production scale from the cut parts of the garment comprising providing a work area, said area being divided into divisions in each of which all the sewing operations on one portion of the garment are performed, supplying an equal number of each of the garment parts, delivering the parts to the proper divisions, sewing the parts of each portion of the garment into subassemblies, moving the subassemblies from their respective divisions to a matching station, matching the subassemblies for garments of the same size and style, moving the matched subassemblies through the assembly division where they are sewed together to form the completed garments.

3. The method of manufacturing garments on a mass production scale from the cut parts of the garment comprising providing a work area, said area being divided into divisions in each of which all the sewing operations on one portion of the garment are performed, supplying a full cut of each of the garment parts, dividing the cut of each part into bundles comprising an even fraction of a cut, delivering the bundles to the proper divisions, sewing the parts of each portion of the garment into subassemblies, moving the subassemblies from their respective divisions to a matching station, matching the subassemblies for garments of the same size and style, and moving the matched subassemblies through the assembly division where they are sewed together to form the completed garments.

4. The method of manufacturing garments on a mass production scale from the cut parts of the garment comprising providing a work area, said area being divided into divisions in each of which all the operations on one portion of the garment are performed, supplying a full cut of each of the garment parts, dividing the cut of each part into bundles comprising an even fraction of a cut, delivering the bundles to the proper divisions, sewing the parts of each portion of the garment into subassemblies, moving the subassemblies from their respective divisions to a matching station, matching the subassemblies for garments of the same size and style, moving the matched subassemblies through the assembly division where they are sewed together to form the completed garments, in each division inspecting the sewed parts after each sewing operation and immediately repairing discovered defects, and finally moving the completed garments through the inspection division where they are inspected and the discovered defects are repaired.

5. The method of manufacturing pants on a mass production scale from the cut parts of the pants comprising providing a work area, said area being divided into divisions in each of which the different operations are performed, supplying an equal number of each of the parts, delivering the parts to accessory, back legs and front legs divisions, sewing the pockets, waistbands, flys and button strips in the accessory division to make subassemblies of these parts, moving the side pockets, flys and button strips to the front legs division, moving the hip pockets to the back legs division, sewing the front legs including setting the side pockets and running on the flys and button strips in the front legs division, sewing the back legs including setting the hip pockets in the back legs division, moving the waistbands, front legs and back legs from their respective divisions to a matching station, matching the waistbands, front legs and back legs for pants of the same size and style, and moving the matched parts through an assembly division wherein the matched parts are sewed into completed pants.

6. The method of manufacturing pants on a mass production scale from the cut parts of the pants comprising providing a work area, said area being divided into divisions in each of which the different operations are performed, supplying a full cut of each of the parts, dividing the cut of each part into bundles comprising an even fraction of a cut, providing each bundle with a record ticket which remains with the bundle throughout all the operations performed on the pants and serves as a record of the operations and completed pants, delivering the bundles of parts to accessory, back legs and front legs divisions, sewing the pockets, waistbands, flys and button strips in the accessory division to make subassemblies of these parts, moving the side pockets, flys and button strips to the front legs division, moving the hip pockets to the back legs division, sewing the front legs including setting the side pockets and running on the flys and button strips in the front legs division, sewing the back legs including setting the hip pockets in the back legs division, moving the waistbands, front legs and back legs from their respective divisions to a matching station, matching the bundles, waistbands, front legs and back legs for pants of the same size and style, and moving the matched parts through the assembly and finishing divisions wherein the matched parts are sewed into complete pants and finished.

7. The method of manufacturing pants on a mass production scale from the cut parts of the pants comprising providing a work area, said area being divided into divisions in each of which the different operations are performed, supplying a full cut of each of the parts, dividing the cut of each part into bundles comprising an even fraction of a cut, delivering the bundles of the parts to accessory, back legs and front legs divisions, sewing the pockets, waistbands, flys and button strips in the accessory division to make subassemblies of the parts, moving the side pockets, flys and button strips to the front legs division, moving the hip pockets to the back legs division, sewing the front legs including setting the side pockets and running on the flys and button strips in the front legs division, sewing the back legs including setting the hip pockets in the back legs division, moving the waistbands, front legs and back legs from their respective divisions to a matching station, matching the bundles of waistbands, front legs and back legs for pants of the same size and style, moving the matched parts through assembly and finishing divisions wherein the matched parts are sewed into complete pants and finished, in each division inspecting the sewed parts after each sewing operation and immediately repairing discovered defects, and finally moving the completed pants through an inspection division where they are inspected and discovered defects are repaired.

8. The method of manufacturing pants on a mass production scale from the cut parts of the pants comprising providing a work area, said area being divided into divisions in each of which the different operations are performed, providing mobile trucks and racks by means of which the pants in the various stages of completion are moved through the work operations within and between the divisions, supplying a full cut of each of the parts, dividing the cut of each part into bundles comprising an even fraction of a cut, placing the bundles in the mobile trucks for delivery to accessory, back legs and front legs divisions, sewing the pockets, waistbands, flys and buttonstrips in the accessory division to make subassemblies of these parts, moving the side pockets, flys and button strips to the front legs division, moving the hip pockets to the back legs division, sewing the front legs including setting the side pockets and running on the flys and button strips in the front legs division, sewing the back legs including setting the hip pockets in the back legs division, moving the waistbands, front legs and back legs from their respective divisions to a matching station, matching the waistbands, front legs and back legs for pants of the same size and style, moving the matched parts through assembly and finishing divisions wherein the matched parts are sewed into complete pants and finished, in each division inspecting the sewed parts after each sewing operation and immediately repairing discovered defects, and finally moving the completed pants through an inspection division where they are inspected and discovered defects are repaired.

HERSCHEL L. FOUCH.
RAYMOND S. YORTY.

REFERENCES CITED

The following references are of record in the file of this patent:

UNITED STATES PATENTS

| Number | Name | Date |
|---|---|---|
| 1,563,057 | Williams | Nov. 24, 1925 |
| 1,981,124 | Schmidt et al. | Nov. 20, 1934 |
| 1,991,397 | Lampman | Feb. 19, 1935 |
| 2,419,422 | Schulein | Apr. 22, 1947 |
| 2,424,355 | Goldman | July 22, 1947 |